(No Model.)

A. CHEZEM.
WEED CUTTER.

No. 350,117.     Patented Oct. 5, 1886.

Witnesses:
R. H. Orwig
C. W. Stiles

Inventor:
Andrew Chezem
By Thomas G. Orwig, Atty.

UNITED STATES PATENT OFFICE.

ANDREW CHEZEM, OF SERGEANT BLUFF, IOWA.

WEED-CUTTER.

SPECIFICATION forming part of Letters Patent No. 350,117, dated October 5, 1886.

Application filed May 7, 1886. Serial No. 201,502. (No model.)

*To all whom it may concern:*

Be it known that I, ANDREW CHEZEM, a citizen of the United States of America, and a resident of Sergeant Bluff, in Woodbury county, in the State of Iowa, have invented an Improved Weed-Cutter or Horse-Hoe, of which the following is a specification.

My object is to save time, labor, and expense in cultivating corn and other field crops that require the young plants to be protected from grass and weeds growing up between the rows; and my invention consists in the construction and combination, as hereinafter set forth, and pointed out in my claim, of a cutter adapted to be advanced horizontally between two rows, and two cutters adapted to make continuous vertical cuts in line with the ends of the horizontal cutter, with a frame having a swiveled runner at its front and nothing but the cutters at its rear end to support it elevated from the ground as it is advanced between two rows by means of a horse hitched to its front end.

Figure 1:
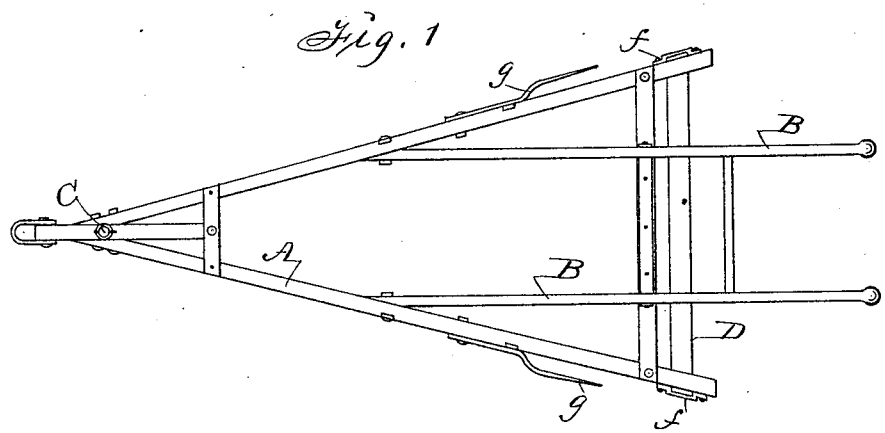
Figure 2:
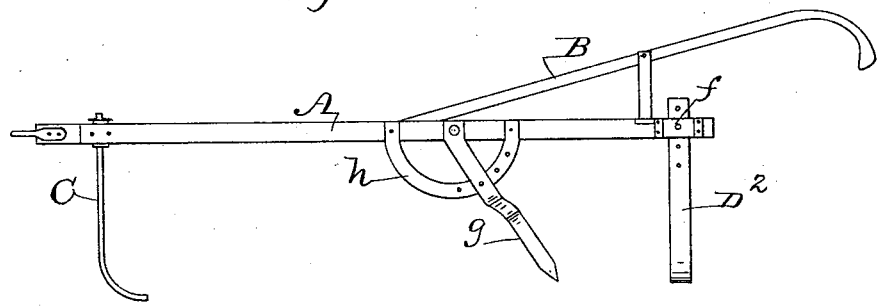
Figure 3:
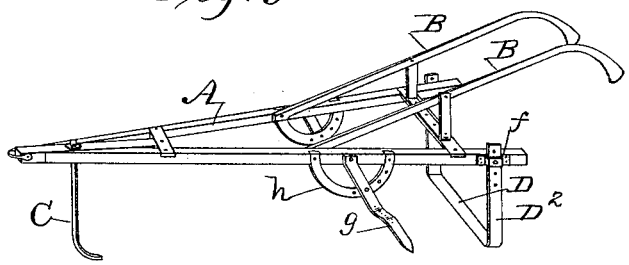

Figure 1 of the accompanying drawings is a top view, and Fig. 2 a side view, and Fig. 3 a perspective view, of the machine. Jointly considered they clearly illustrate the construction, operation, and utility of my complete invention.

A represents a triangular-shaped frame of common form, that may be made of wood or iron and vary in size as desired. It is provided with handles B, by means of which it can be lifted and governed when in practical use.

C is a runner consisting of a metal bar having a curved lower end, pivoted to the front end of the frame to support it in an elevated position.

D is a straight and flat cutting-blade made of steel. It has shanks D², that extend upward and at right angles from its ends. They may be formed integral with the blade or fixed thereto. Each shank has a series of perforations at its top end.

*f* are perforated metal loops fixed to the rear ends of the side pieces of the frame A, through which loops the shanks D² are passed upward to adjustably and detachably connect the cutter with the frame by means of movable pins or bolts passed through coinciding perforations in the loops, shanks, and ends of the side pieces of the frame.

*g* are steel cutters having outward bends at their centers, pivoted to the side pieces of the frame in advance of the cutter D in such a manner that they will penetrate the ground and make vertical cuts in line with the ends of the horizontal cutter and at the sides of two rows of plants, to sever vines, and to prevent the horizontal cutter from becoming clogged. Semicircular and perforated braces *h*, fixed to the side pieces of the frame and in concentric positions with the cutters *g*, serve as a means to fix the cutters at any inclination desired by simply passing pins or bolts through the cutters and the braces, as shown.

In the practical use of my machine I hitch a horse to the front end of the frame, take hold of the handles at the rear end, and then drive across the field between two rows of plants in such a manner that the vertical cutters will run close to the plants and the horizontal cutter extend across from one of the vertical cuts to the other, to scrape the soil at any depth desired, as required to cut the roots of all grass and weeds growing between the two parallel vertical cuts and rows of plants, as required to kill the grass and weeds, so that the growth of the plants will not be restricted thereby, and also in such a manner that the soil between the rows of plants will be kept in good order to facilitate the operation of cultivators between the rows for the purpose of loosening and stirring the soil and throwing it against the plants after they have grown sufficiently high for the purpose.

I am aware that triangular-shaped cultivator-frames are common, that the front end of such a frame has been supported upon a runner, and that laterally-bent cutters have been adjustably connected with plow-beams; but my combination of a horizontal blade and vertical cutters with the rear portion of a triangular-shaped frame having a runner at its front end in such a manner that the blade and cutters can be readily adjusted relative to each other as required, to regulate their joint operations in cutting and scraping the surface of the ground between two rows of plants, produces a new and useful machine specially adapted for the purposes hereinbefore stated.

I claim as my invention—

The improved weed-cutter consisting of a straight cutting-blade having shanks extending at right angles from its ends, a triangular-shaped frame having a runner at its front end and laterally-bent cutters at its sides, substantially as shown and described, to operate in the manner set forth.

ANDREW CHEZEM.

Witnesses:
A. AUGHENBAUGH,
W. A. TERRY.